(12) United States Patent
Osaki et al.

(10) Patent No.: US 9,079,167 B2
(45) Date of Patent: Jul. 14, 2015

(54) $NO_x$ PURIFICATION CATALYST

(71) Applicant: TOYOTA JIDOSHA KABUSHIKI KAISHA, Aichi-ken (JP)

(72) Inventors: Mayuko Osaki, Susono (JP); Hirohito Hirata, Sunto-gun (JP); Naoyuki Hara, Nishikamo-gun (JP); Brian Johnson, Cambridge (GB); Andrew Wheatley, Cambridge (GB); Helen Skelton, Slip End (GB); Muriel Lepage, Zaventem (BE)

(73) Assignees: TOYOTA JIDOSHA KABUSHIKI KAISHA, Aichi-ken (JP); CAMBRIDGE ENTERPRISE LIMITED, Cambridge (GB)

( * ) Notice: Subject to any disclaimer, the term of this patent is extended or adjusted under 35 U.S.C. 154(b) by 0 days.

(21) Appl. No.: 14/209,379

(22) Filed: Mar. 13, 2014

(65) Prior Publication Data
US 2014/0194281 A1 Jul. 10, 2014

Related U.S. Application Data

(63) Continuation of application No. 13/983,694, filed as application No. PCT/JP2011/052975 on Feb. 7, 2011.

(51) Int. Cl.
| | |
|---|---|
| *B01J 23/00* | (2006.01) |
| *B01J 23/02* | (2006.01) |
| *B01J 23/04* | (2006.01) |
| *B01J 23/58* | (2006.01) |
| *B01J 21/04* | (2006.01) |
| *B01J 23/89* | (2006.01) |

(52) U.S. Cl.
CPC .................................... *B01J 23/892* (2013.01)

(58) Field of Classification Search
CPC ........ B01J 23/52; B01J 23/755; B01J 23/892; B01J 35/02
USPC .......................... 502/330, 335, 337, 344, 439
See application file for complete search history.

(56) References Cited

U.S. PATENT DOCUMENTS

| | | | | |
|---|---|---|---|---|
| 5,997,835 | A * | 12/1999 | Hyldtoft et al. | ............ 423/418.2 |
| 8,450,235 | B2 * | 5/2013 | Suzuki et al. | ................. 502/325 |
| 8,461,373 | B2 * | 6/2013 | Suzuki et al. | ................. 560/103 |
| 2003/0060655 | A1 | 3/2003 | Hayashi et al. | |
| 2006/0128565 | A1 * | 6/2006 | Flytzani-Stephanopoulos et al. | ............................. 502/439 |
| 2007/0166220 | A1 | 7/2007 | Ceyer et al. | |

FOREIGN PATENT DOCUMENTS

| | | |
|---|---|---|
| EP | 1 378 290 A1 | 1/2004 |
| EP | 2 177 267 A1 | 4/2010 |
| JP | 10-216518 A | 8/1998 |
| JP | 10-216519 A | 8/1998 |
| JP | 2001-239161 A | 9/2001 |
| JP | 2003-190787 A | 7/2003 |

* cited by examiner

*Primary Examiner* — Cam N. Nguyen
(74) *Attorney, Agent, or Firm* — Sughrue Mion, PLLC

(57) ABSTRACT

The invention relates to a catalyst able to exhibit an $NO_x$ purification performance at a low temperature and/or in an oxidizing atmosphere, that is, a nitrogen oxide purification catalyst including gold atoms and nickel atoms in a solid and a state of close proximity.

4 Claims, 13 Drawing Sheets

● O₂, N₂ DESORPTION SITE(Au)
○ NO DISSOCIATION SITE(Ni)

Au:Ni=50:50

Au:Ni=67:33

Au:Ni=17:83

$NO_X$ PURIFICATION CATALYST

This is a Continuation of application Ser. No. 13/983,694 filed Aug. 5, 2013, which is the National Stage of PCT/JP2011/052975 filed Feb. 7, 2011. The entire disclosures of the prior applications, application Ser. No. 13/983,694 and PCT/JP2011/052975 are hereby incorporated by reference.

BACKGROUND OF THE INVENTION

1. Field of the Invention

The present invention relates to a nitrogen oxides (below, sometimes abbreviated as "$NO_X$") purification catalyst, more particularly relates to a novel $NO_X$ purification catalyst including gold atoms and nickel atoms in a solid that is able to purify $NO_X$ at a low temperature and/or in an oxidizing atmosphere.

2. Description of the Related Art

In recent years, from the viewpoint of protection of the global environment, exhaust gas regulations have been toughened around the world with each passing year. As one means for dealing with this, in internal combustion engines, exhaust gas purification catalysts are being used. In such exhaust gas purification catalysts, in order to efficiently remove HC (hydrocarbons), carbon monoxide (CO), and $NO_X$ in the exhaust gas, platinum, gold, rhodium, and other precious metals have been used as catalyst ingredients.

In motor vehicles using such purification catalysts, for example gasoline engine vehicles and diesel engine vehicles, various systems are being used to improve the catalytic activity and the fuel economy. For example, for improving fuel economy during steady state operation fuel is being burned under conditions of a lean (excess oxygen) air-fuel ratio (A/F), while to improve the catalytic activity, fuel is burned under temporarily stoichiometric (stoichiometric air-fuel ratio, A/F=14.7) to rich (excess fuel) conditions.

These conditions apply because conventionally known platinum, gold, rhodium, and other precious metal catalysts exhibit low $NO_X$ purification performances at low temperature and under oxidizing conditions. To improve the purification performance, the purification catalyst has presently to be operated high in temperature and HC or CO etc. has to be added to establish a reducing atmosphere. Therefore, even during steady state operation, it is not possible to increase the air-fuel ratio (A/F). With the above precious metal catalysts, there is therefore a limit to the possible improvement of the fuel economy.

In such conventionally known precious metal catalysts, to obtain good purification performance, energy for raising the purification catalysts to a high temperature, fuel for temporarily exposing the purification catalysts to a reducing atmosphere, and reduction of the air-fuel ratio (A/F) in the engine are all required. To improve the fuel economy in automobile engines and other internal combustion engines, therefore, a new purification catalyst able to exhibit a good $NO_X$ purification performance at a low temperature and/or in an oxidizing atmosphere is being sought.

Furthermore, all of the above precious metal catalysts face the problem of resource depletion. $NO_X$ purification catalysts using other metals to obtain purification performances equal to or better than those of conventional precious metal catalysts or able to reduce the amounts of the precious metals used are therefore being sought.

For example, Japanese Patent Publication (A) No. 10-216518 describes a gold alloy catalyst comprised of gold and one or more metals (M) selected from platinum, palladium, silver, copper, and nickel, having a weight ratio Au/M of 1/9 to 9/1, and having an amount of solute gold in the alloy of 20 to 80 wt %. Further, the specific catalysts discussed in this publication incorporate an alloy of gold and another metal (palladium or platinum) on an $Al_2O_3$ carrier. These exhibit a high $NO_X$ purification performance in a reducing atmosphere, but have a low $NO_X$ purification performance at a low temperature and/or in an oxidizing atmosphere.

Further, Japanese Patent Publication (A) No. 10-216519 describes a metal particulate-carrying oxide catalyst produced by heat treating a metal compound composed of one or more elements selected from gold, platinum, palladium, rhodium, silver, iridium, ruthenium, and osmium and one or more elements selected from metals of strontium, niobium, lithium, lanthanum, aluminum, silicon, magnesium, calcium, barium, cerium, neodymium, titanium, iron, cobalt, nickel, copper, zinc, zirconium, vanadium, tantalum, chromium, molybdenum, tungsten, sodium, potassium, beryllium, scandium, yttrium, indium, tin, lead, and bismuth in an atmosphere containing oxygen. Further, the catalysts shown as specific examples in this publication are catalysts composed of a gold alloy incorporating strontium or lanthanum on an $Al_2O_3$ carrier. They exhibit a relatively high $NO_X$ purification performance in a reducing atmosphere, but have an extremely low $NO_X$ purification performance at a low temperature and/or in an oxidizing atmosphere.

Further, Japanese Patent Publication (A) No. 2001-239161 describes a low temperature harmful gas-purification catalyst comprised of a metal oxide on carbonaceous material carrier using high temperature/high pressure fluid to carry ultrafine particles of at least one type of metal selected from the group comprising platinum, palladium, rhodium, ruthenium, iridium, osmium, gold, silver, copper, manganese, iron, and nickel. Further, the catalysts shown as specific examples in this publication are purification catalysts supporting one of platinum, palladium, rhodium, ruthenium, nickel, or gold. They exhibit a good $NO_X$ purification performance in a reducing atmosphere.

Furthermore, Japanese Patent Publication (A) No. 2003-190787 describes an engine exhaust gas purification catalyst mainly comprised of $12CaO.7Al_2O_3$ and carrying one or more elements selected from gold, silver, iron, zinc, manganese, cerium, and platinum group elements. Further, this publication shows, as specific examples, that purification catalysts mainly comprised of $12CaO.7Al_2O_3$ carrying one element out of element of gold, silver, platinum, palladium, copper, iron, zinc, manganese, cerium, or rhodium or two elements out of elements of silver and rhodium, ruthenium, or copper fired at 600° C. exhibit the effect of reducing the combustion temperature by the oxidation reaction of the particulate matter (PM) by oxygen radicals. However, this publication does not prescribe the positional relationship of the two types of metals. It is unclear if the catalysts shown as specific examples in this publication exhibit an $NO_X$ purification performance.

As related art, therefore, there are the above Japanese Patent Publication (A) No. 10-216518, Japanese Patent Publication (A) No. 10-216519, Japanese Patent Publication (A) No. 2001-239161, and Japanese Patent Publication (A) No. 2003-190787.

SUMMARY OF THE INVENTION

Therefore, in these known purification catalysts, it was difficult to reduce the amount of precious metal used and obtain good $NO_X$ purification performance at a low temperature and/or in an oxidizing atmosphere.

Therefore, an object of the present invention is to provide an $NO_X$ purification catalyst able to reduce the amount of precious metal used and whilst exhibiting a good $NO_X$ purification performance at a low temperature and/or in an oxidizing atmosphere.

The inventors engaged in intensive research for the purpose of realizing the above object and as a result have discovered that the decomposition of $NO_X$ is comprised of the dissociative adsorption of $NO_X$ followed by the desorption of $N_2$ and $O_2$ and that a material with a low $N_2$ desorption temperature and $O_2$ desorption temperature, in particular a low $O_2$ desorption temperature, may offer a high $NO_X$ purification performance. This discovery has led the inventors to engage in further studies and to complete the present invention.

The present invention relates to a nitrogen oxide purification catalyst including gold atoms and nickel atoms in a solid and in a state of close proximity.

According to the present invention, it is possible to obtain a catalyst that uses less precious metal and exhibits a good $NO_X$ purification performance at a low temperature and/or in an oxidizing atmosphere.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1A:
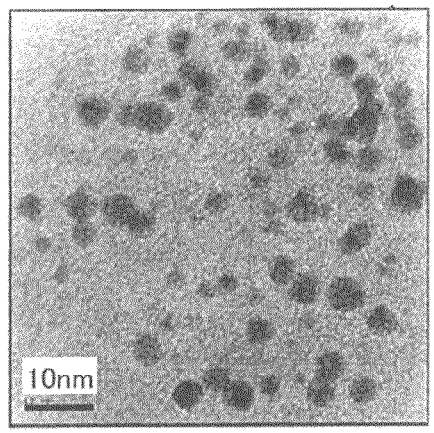
FIG. 1A is a TEM image of AuNi (Au:Ni=50:50) nanoparticles of an AuNi/$Al_2O_3$-based $NO_X$ purification catalyst obtained as an example of the invention.

The $NO_X$ purification catalyst of the present invention has to include gold atoms and nickel atoms in a solid and a state of close proximity.

The expression "gold atoms and nickel atoms in a solid and a state of close proximity" means a state in which at least one of the gold atoms is contiguous with at least one of the nickel atoms in primary particles that are either nanoparticles or thin films.

Below, referring to the drawings, embodiments of the present invention will be explained in detail.

Figure 1B:
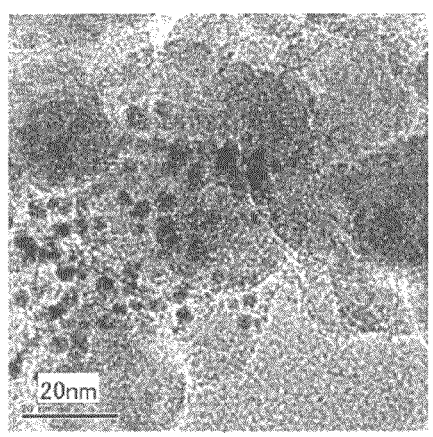
FIG. 1B is a TEM image changing the above scale.
Figure 1C:
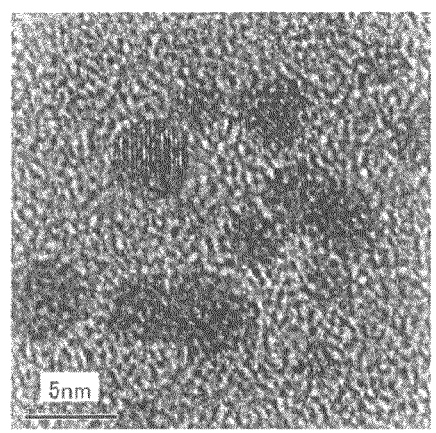
FIG. 1C is a TEM image further changing the above scale.

Referring to FIG. 1A, FIG. 1B, and FIG. 1C, a $NO_X$ purification catalyst obtained as an example of the invention is comprised of, as one example of a support carrier, $Al_2O_3$ carrier particles, on which are supported nanoparticles of Au—Ni(50:50) bimetal particles with a mean particle size of 3.76±0.76 nm in which gold atoms and nickel atoms are present in Au:Ni=50:50 and a state of close proximity.

Figure 3:
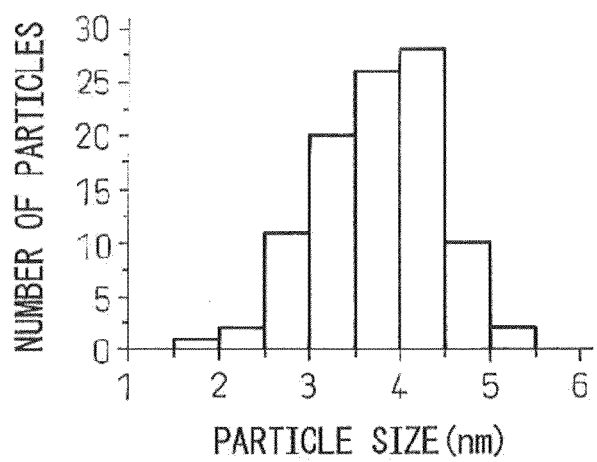
FIG. 3 is one example of histogram showing the particle size distribution of 100 nanoparticles in an HRTEM image obtained for AuNi (Au:Ni=50:50) nanoparticles of an AuNi/$Al_2O_3$-based $NO_X$ purification catalyst obtained as an example of the invention.

Referring to FIG. 3, it is shown that the particle size distribution for 100 nanoparticles in an HRTEM Multiple images strictly speaking of this $NO_X$ purification catalyst is in the range of 1.5 to 5.5 nm.

Figure 5:
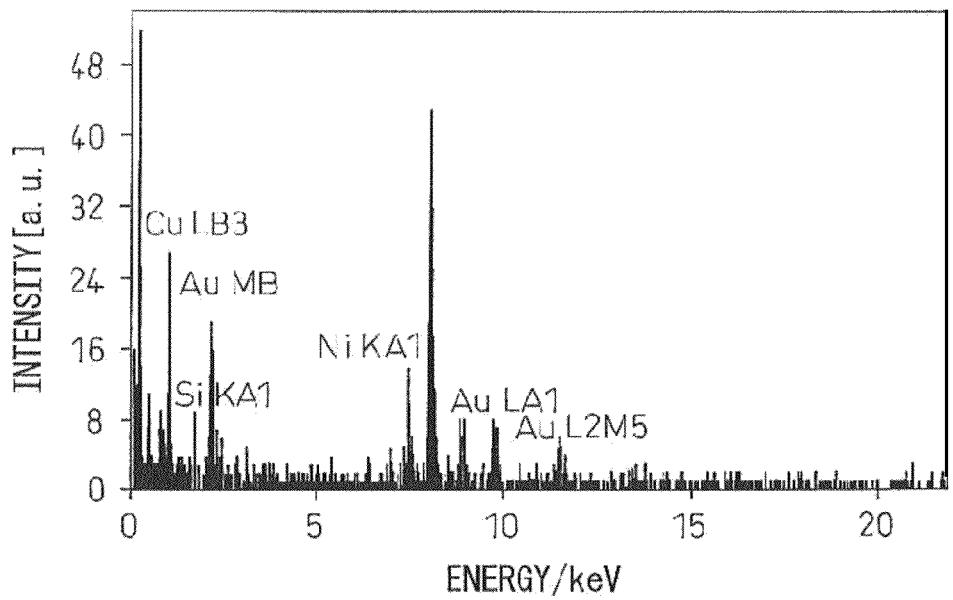
FIG. 5 is a TEM-EDS spectrum of AuNi (Au:Ni=50:50) nanoparticles of an AuNi/$Al_2O_3$-based $NO_X$ purification catalyst obtained as an example of the invention.

Referring to FIG. 5, it is shown by the TEM-EDS spectrum that the AuNi (Au:Ni=50:50) bimetal and core-shell particles of the $NO_X$ purification catalyst on a Cu coated grid.

Figure 7:
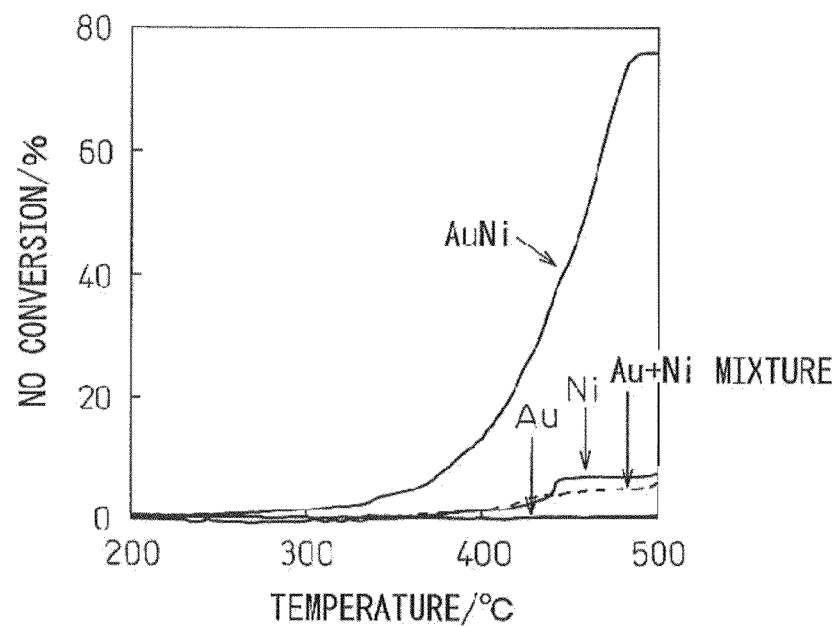
FIG. 7 is a graph showing a comparison of the NO—CO catalytic activity of an AuNi/$Al_2O_3$-based $NO_X$ purification catalyst obtained as an example of the invention and $NO_X$ purification catalysts outside of the scope of the present invention.

From FIG. 7, it is shown that the $NO_X$ purification catalyst comprised of $Al_2O_3$ on which Au—Ni alloy particles are carried according to an embodiment of present invention has a higher NO—CO catalytic activity in a range of 300 to 500° C. as compared with $NO_X$ purification catalysts that are outside the scope of the present invention and are comprised of $Al_2O_3$ carriers on which nickel alone, gold alone, or a simple mixture of gold and nickel are supported. Moreover, the bimetallic example of the invention can be seen to have a particularly high NO—CO catalytic activity at a temperature of about 425° C. and above. Further, with a simple mixture where, even when using gold and nickel together, the two types of atom cannot be present in close proximity, the NO—CO catalytic activity at 500° C. is even lower than that recorded for nickel alone.

Figure 8:
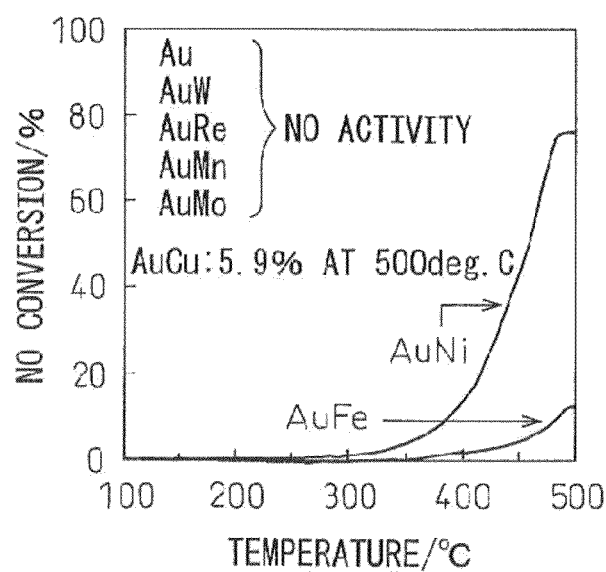
FIG. 8 is a graph showing a comparison of the NO purification characteristics of $NO_X$ purification catalysts obtained as an invention example with $NO_X$ purification catalysts outside the range of the invention.

According to FIG. 8, among the $NO_X$ purification catalysts comprised of $Al_2O_3$ on which a bimetal is supported, an AuNi-based $NO_X$ purification catalyst that represents an embodiment of the present invention exhibits a higher NO conversion rate at temperatures in the range 350 to 500° C. as compared with an AuFe-based $NO_X$ purification catalyst that is outside the range of the present invention. Further, Au-, AuW-, AuRe-, AuMn-, AuMo-, and AuCu(Cu:5.9%)-based $NO_X$ purification catalysts (all outside the range of the invention) all showed NO conversion rates at 500° C. of 0%. This observation clearly demonstrates that the AuNi-based $NO_X$ purification catalyst demonstrates special properties.

Figure 9:
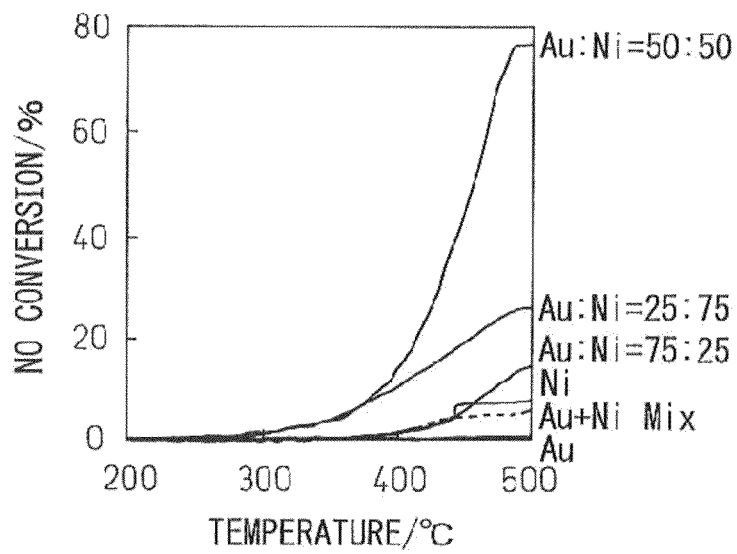
FIG. 9 is a graph showing a comparison of the NO purification characteristics of $NO_X$ purification catalysts obtained as an invention example with $NO_X$ purification catalysts outside the range of the invention.

Referring to FIG. 9, $NO_X$ purification catalysts comprised of $Al_2O_3$ support on which are supported Au—Ni nanoparticles comprised of gold atoms and nickel atoms alloyed in Au:Ni=50:50, 25:75, and 75:25 and present in a state of close proximity all exhibit good NO purification characteristics at temperatures of approximately 425° C. or more. Among these examples of the invention, Au:Ni=50:50 exhibits the highest NO conversion rate. After that, Au:Ni=25:75 and Au:Ni=75:25, in that order, have lower NO conversion. As opposed to this, it can be seen that $NO_X$ purification catalysts supporting nanoparticles of nickel or gold alone or a simple mixture of gold and nickel on $Al_2O_3$ carriers only exhibit relatively low NO conversion or even at 500° C.

Figure 10:
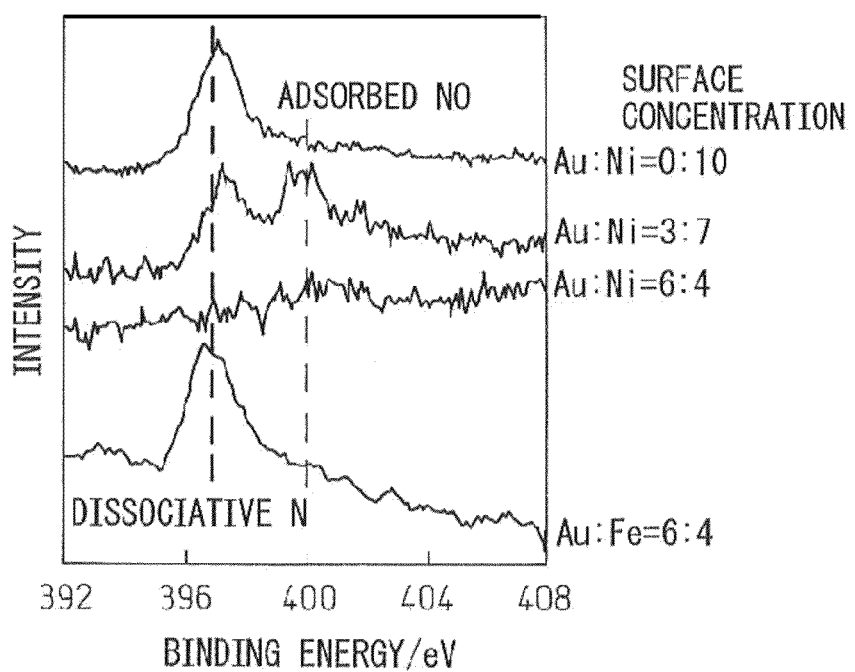
FIG. 10 shows the N1s region of an XPS spectrum obtained after the adsorption of NO at 1 Langmuir and room temperature onto $NO_X$ purification catalysts obtained as examples of the invention and also shows the activity of a catalyst outside the range of the invention for comparison.

From FIG. 10 it can be understood that an AuNi nanoparticle-based $NO_X$ purification catalyst comprised of an $Al_2O_3$ carrier on which gold atoms and nickel atoms are present in Au:Ni=3:7 or 6:4 and are in a state of close proximity presents different NO dissociative adsorption characteristic to those of a $NO_X$ purification catalysts that are outside of the scope of the present invention.

Figure 2A:
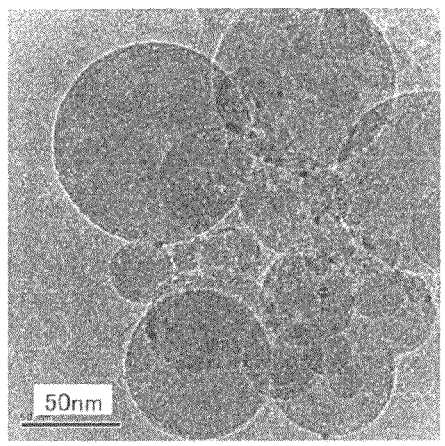
FIG. 2A is a TEM image of AuNi (Au:Ni=50:50) nanoparticles of an AuNi/$SiO_2$-based $NO_X$ purification catalyst obtained as an example of the invention.
Figure 2B:
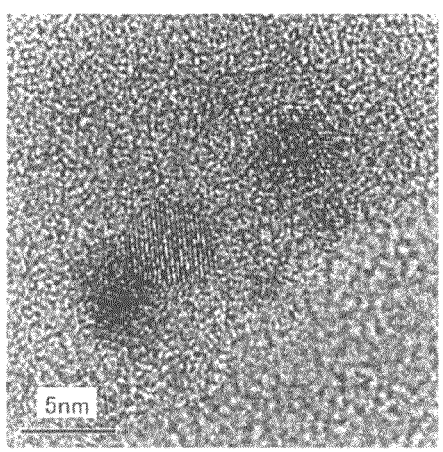
FIG. 2B is a TEM image changing the above scale.
Figure 4:
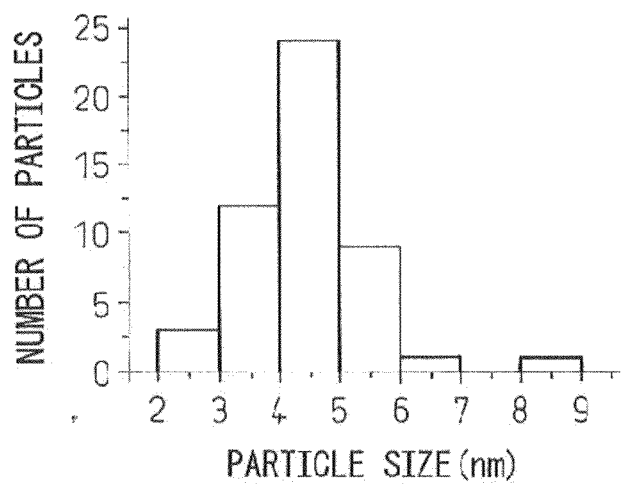
FIG. 4 is a distribution histogram showing the particle size distribution of 100 nanoparticles in an HRTEM image obtained for AuNi (Au:Ni=50:50) nanoparticles of an AuNi/$SiO_2$-based $NO_X$ purification catalyst obtained as an example of the invention.

Referring to FIG. 2A, FIG. 2B, and FIG. 4, it can be seen that an example of the invention in which an AuNi (50:50) bimetal particle-based $NO_X$ purification catalyst is comprised of an $SiO_2$ carrier on which gold atoms and nickel atoms are present in Au:Ni=50:50 and a state of close proximity reveals nanoparticles of a mean particle size of 4.37+/−0.97 nm and particle size distribution in the range of 2 to 9 nm.

Figure 6:
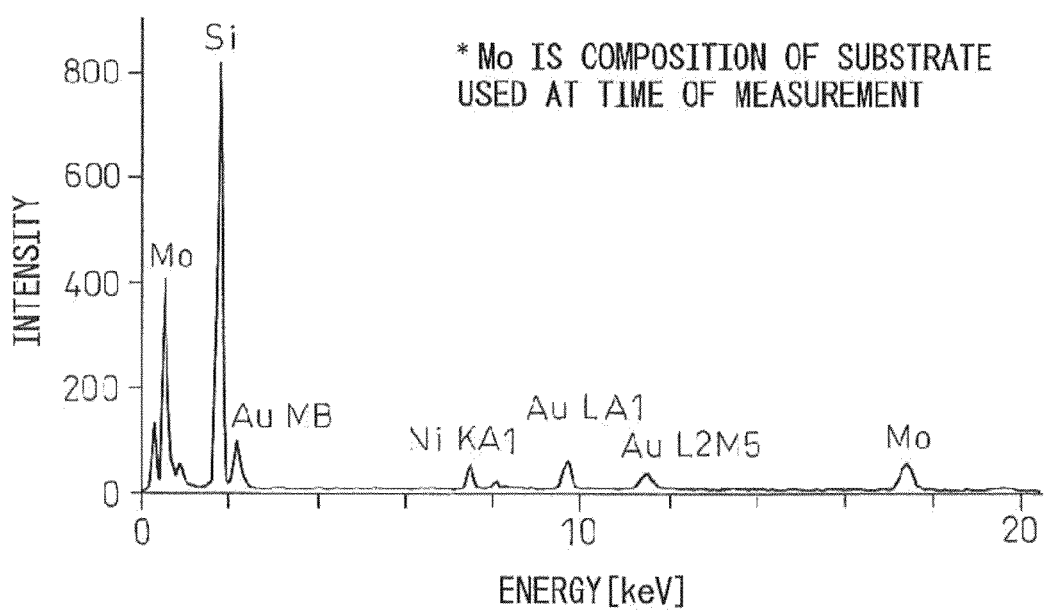
FIG. 6 is a TEM-EDS spectrum of AuNi (Au:Ni=50:50) nanoparticles of an AuNi/$SiO_2$-based $NO_X$ purification catalyst obtained as an example of the invention.

Referring to FIG. 6, it is confirmed by the TEM-EDS spectrum that AuNi bimetal particles supported on $SiO_2$ (Au: Ni=58:42) include both gold and nickel of the metals.

Figure 11:
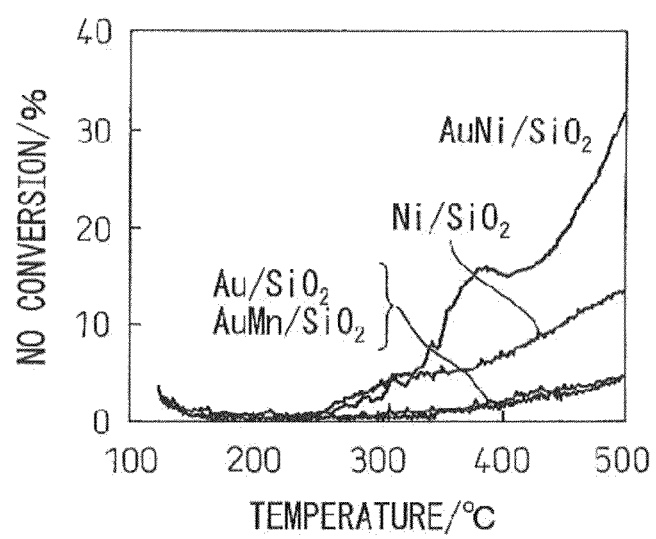
FIG. 11 is a graph showing a comparison of the NO—$H_2$ catalytic activity of an AuNi/$SiO_2$-based $NO_X$ purification catalyst obtained as an example of the invention and $NO_X$ purification catalysts outside the scope of the present invention.

From FIG. 11 it can be seen that an example of the present invention in which an $NO_X$ purification catalyst is comprised of $SiO_2$ supporting AuNi bimetal particles exhibits a higher NO—$H_2$ catalytic activity in the range of 350 to 500° C. compared with $NO_X$ purification catalysts outside the scope of the present invention comprising $SiO_2$ carriers on which nickel alone, gold alone, or an AuMn alloy are supported.

Figure 12:
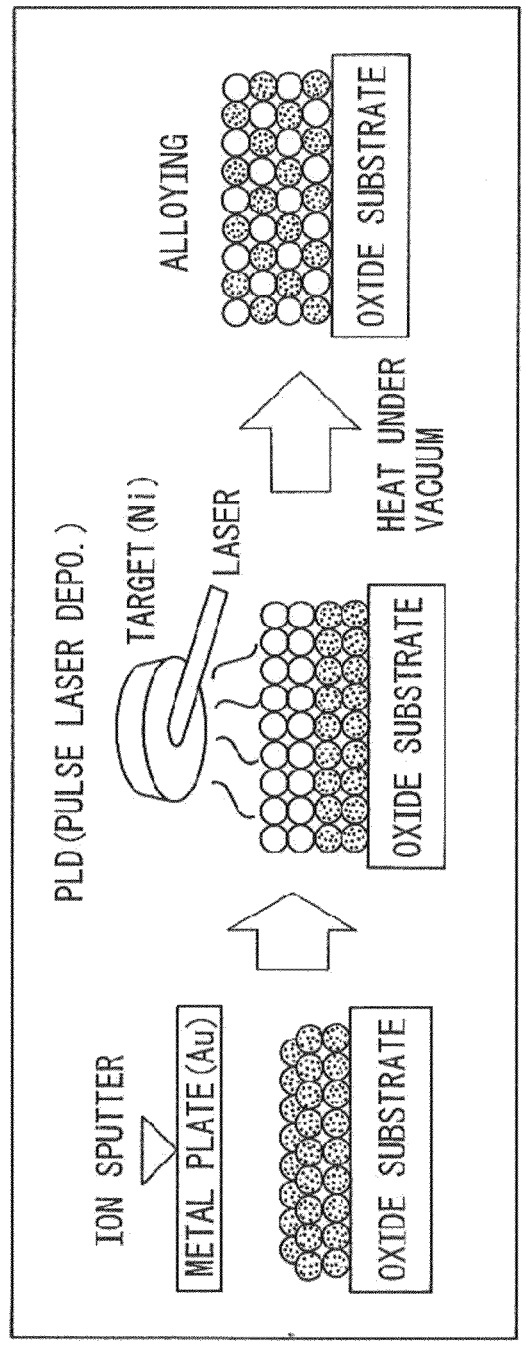
FIG. 12 is a schematic view showing an example of the production of a bimetal thin film $NO_X$ purification catalyst obtained as another example of the present invention.

From FIG. 12 it can be seen that an $NO_X$ purification catalyst according to the embodiments of the present invention can be obtained as an AuNi bimetal thin film/oxide carrier by heat treating a multilayer thin film of gold and nickel on an oxide carrier substrate.

Figure 13:
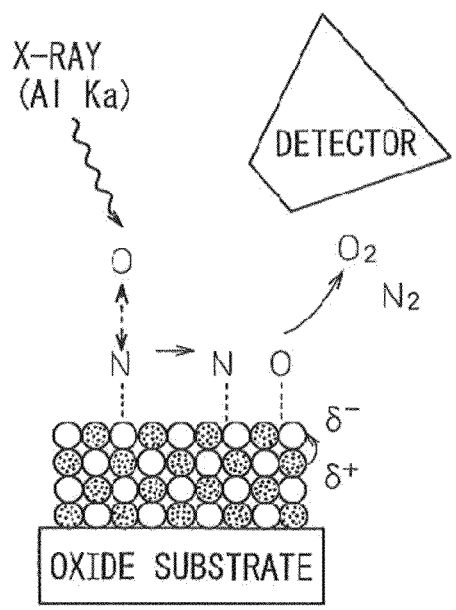
FIG. 13 is showing the possible states of NO adsorption, as observed by in situ XPS for a bimetal thin film $NO_X$ purification catalyst obtained as an example of the present invention.
Figure 14:
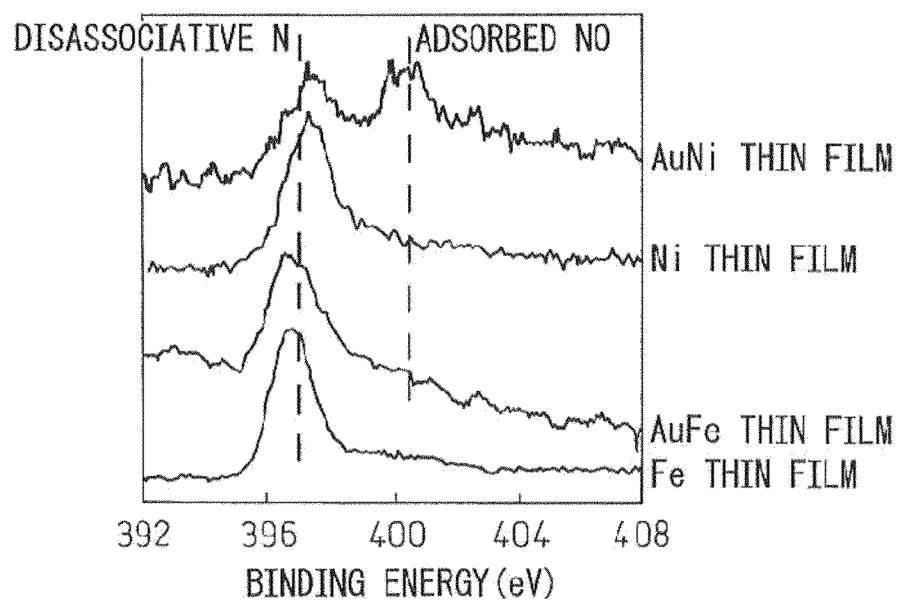
FIG. 14 shows the N1s region of an XPS spectrum obtained after the adsorption of NO at 1 Langmuir and room temperature onto a bimetal thin film $NO_X$ purification catalyst obtained as an example of the invention and also shows the activity of catalyst thin films outside the range of the invention for comparison.

This AuNi bimetal thin film, as shown in FIG. 13, has been investigated by in situ XPS measurement, as shown in FIG. 14, and gives an N1s XPS spectrum showing NO disassociative adsorption characteristics that are different to those seen for an AuFe thin film.

Figure 15:
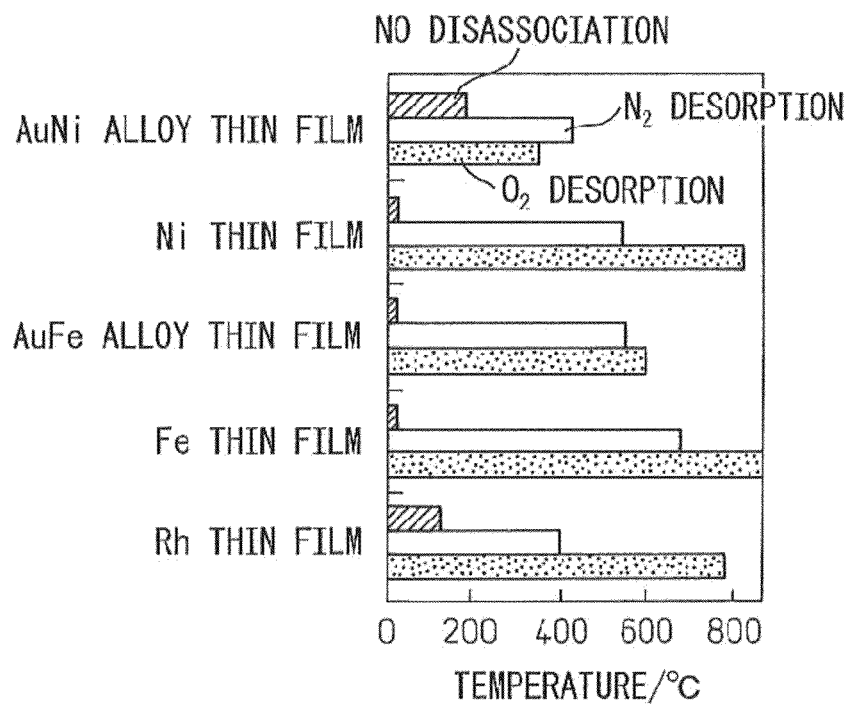
FIG. 15 is a bar graph showing the NO dissociation and $O_2$ and $N_2$ desorption temperatures (under high vacuum) on/from a bimetal thin film $NO_X$ purification catalyst obtained as an example of the present invention, for metal thin film $NO_X$ purification catalysts outside of the scope of the present invention, and also for metal thin films.

Referring to FIG. 15, it can be seen that, according to the AuNi bimetal thin film of the present invention, the presence of gold promotes $N_2$ desorption and $O_2$ desorption from nickel and results in a higher decomposition performance than Rh. The theory behind the effect by this AuNi bimetal thin film has not yet been fully elucidated, but the decomposition reaction of NO comprises the disassociative adsorption of NO and the subsequent desorption of $N_2$ and $O_2$. It is believed that the lower the $N_2$ and $O_2$ desorption temperatures, the higher the NO purification performance. In FIG. 15, the difficulty in desorbing $N_2$ and $O_2$ is probably the cause of the lower activity in all systems reported other than AuNi bimetal that is an example of the invention. With the conventional catalyst Rh, NO purification has been shown to be impossible in an oxidizing atmosphere. Instead, it is necessary to establish a reducing atmosphere to reduce the gas and to promote the removal of oxygen at a lower temperature than the NO purification temperature. In contrast to this, with an $NO_X$ purification catalyst that is embodiment of the present invention, it is believed that the AuNi bimetal can provide activation points, whereby the $N_2$ and $O_2$ desorption temperatures fall, so NO purification becomes possible even at a temperature as low as about 400° C. regardless of the atmosphere.

Figure 16:
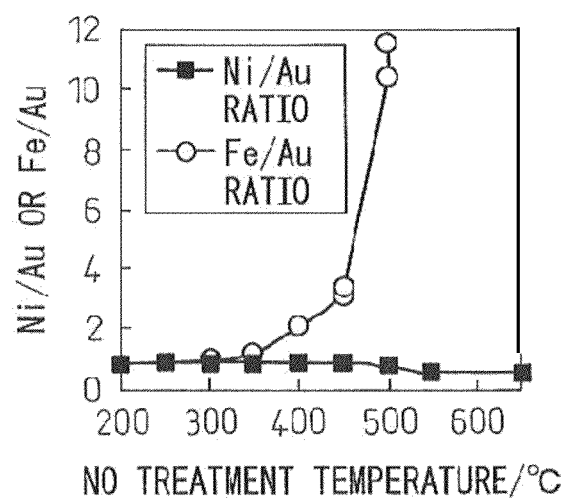
FIG. 16 is a graph showing the relationship between the NO dissociation temperature and the surface concentration ratio for a thin film surface in an AuNi bimetal thin film $NO_X$ purification catalyst that is an example of the invention and also for an AuFe bimetal thin film $NO_X$ purification catalyst that is outside the scope of the present invention.

Furthermore, according to FIG. 16, the AuNi bimetal thin film-based $NO_X$ purification catalyst that represents an embodiment of the present invention does not change in terms of the Ni/Au ratio of the bimetal thin film surface even if the NO treatment temperature is varied in the range of 200 to 650° C. These results show that the AuNi bimetal thin film-based $NO_X$ purification catalyst that is an embodiment of the present invention exhibits special properties as compared with the AuFe bimetal thin film-based $NO_X$ purification catalyst that is outside the scope of the present invention. This latter system greatly changes in Fe/Au ratio at an NO treatment temperature of 350° C. or more. Meanwhile, an AuNi bimetal-based $NO_X$ purification catalyst can easily keep its surface constant.

Figure 17:
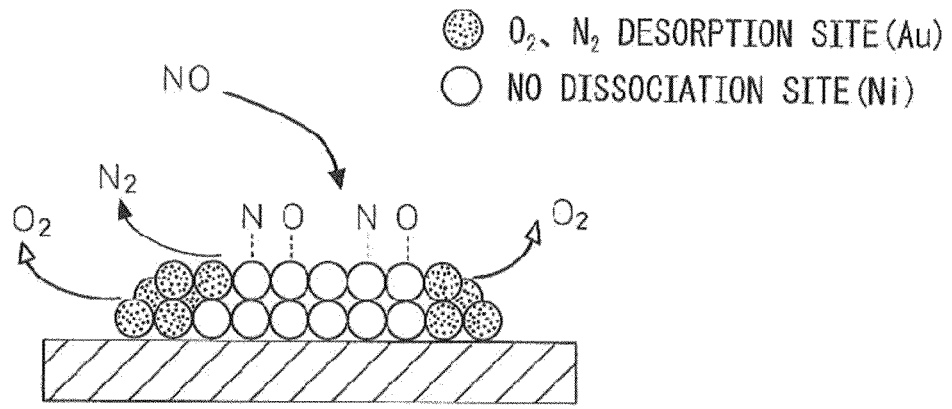
FIG. 17 is a schematic view showing the principle of desorption of $O_2$ and $N_2$ from gold and nickel metal atoms on a support following NO adsorption and decomposition.

As shown in FIG. 17, it is considered that in the AuNi-based $NO_X$ purification catalyst of the present invention, the gold atoms serve as $O_2$ desorption and $N_2$ desorption sites, while the nickel atoms serve as NO decomposition sites.

Figure 18:
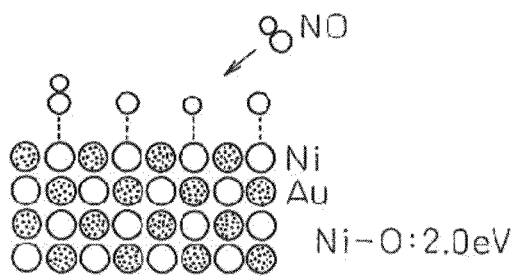
FIG. 18 is a schematic that explains the mechanism of action of an Au—Ni bimetal thin film in an $NO_X$ purification catalyst that is an example of the present application.

As shown in FIG. 18, the AuNi-based $NO_X$ purification catalyst of the present invention is structurally stable in structure, contains gold and nickel atoms resistant to movement, and exhibits a binding energy for oxygen adsorbed on the nickel sites (Ni—O) of 2.0 eV.

Figure 19:
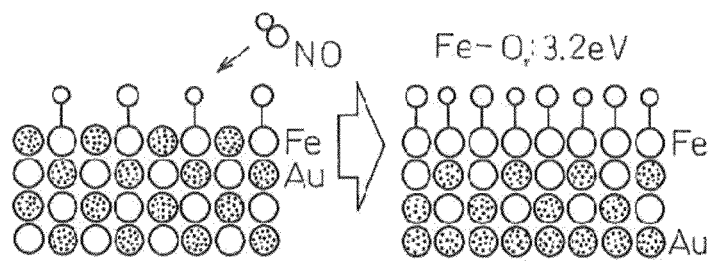
FIG. 19 is a schematic view for explaining the mechanism of action of catalyst performance by an Au—Fe bimetal thin film in an $NO_X$ purification catalyst outside the scope of the present invention.

As opposed to this, as shown in FIG. 19, the AuFe-based $NO_X$ purification catalyst outside the scope of the present invention has iron moving on the surface to form oxides and has a binding energy of the adsorbed oxygen with the iron of (Fe—O) of 3.2 eV, or slightly larger than the binding energy of nickel and oxygen. That is, with an AuFe system, the binding force of the iron to the oxygen is strong and iron oxide easily forms. The iron oxide does not return to the original metal unless reduced by $H_2$ etc. However, this $H_2$ reduction reaction forms $H_2O$, the presence of which is detrimental to the catalytic activity of the alloy.

Figure 20:
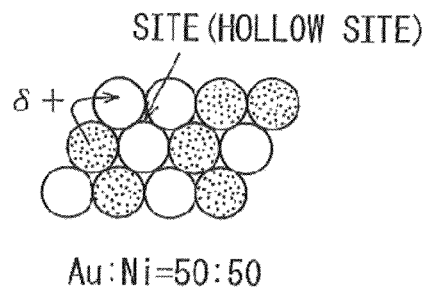
FIG. 20 is a schematic view showing one example of the positional relationship of gold atoms and nickel atoms in a material in which the ratio of the two atoms is Au:Ni=50:50.

In the $NO_X$ purification catalyst of the present invention, as shown in FIG. 20 in the embodiment in which Au:Ni=50:50, the hollow sites surrounded by the three nickel metal atoms are believed to be NO disassociation sites.

Figure 21:
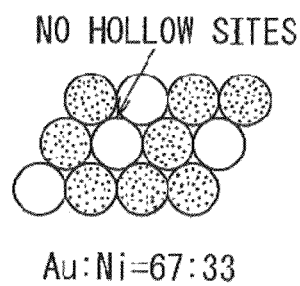
FIG. 21 is a schematic view showing one example of the positional relationship of gold atoms and nickel atoms in a material in which the ratio of the two atoms is Au:Ni=67:33.

Further, in the $NO_X$ purification catalyst of the present invention, as shown in FIG. 21 in the embodiment in which Au:Ni=67:37, there are no hollow sites surrounded by three Nickel metal atoms. However, it is believed that two types of metal atoms can form bridges that can constitute NO disassociation sites.

Figure 22:
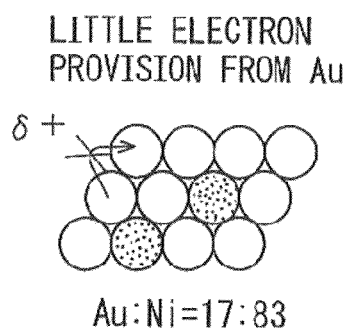
FIG. 22 is a schematic view showing one example of the positional relationship of gold atoms and nickel atoms in a material in which the ratio of the two atoms is Au:Ni=17:83.

Further, in the $NO_X$ purification catalyst of the present invention, as shown in FIG. 22 in the embodiment in which Au:Ni=17:63, there is little electron donation from the gold to nickel, so compared with the previous two embodiments, the catalytic activity is not that high. However, the gold suppresses oxidation of the nickel, so there is the advantageous effect that the nickel becomes resistant to oxidation. It is believed that this can result in a good $NO_X$ purification performance in an oxidizing atmosphere.

Based on the above the $NO_X$ purification catalyst of the present invention must contain gold atoms and nickel atoms in a solid material, for example nanoparticles or a thin film, and in a state of close proximity. For this reason, the region where the atoms are in close proximity may include other metal atoms able to alloy with the two atoms. Therefore, when it is necessary to use a carrier, the $NO_X$ purification catalyst of the present invention can be obtained by, for example, using nanoparticles of the material forming the carrier as cores for obtaining nanoparticles in which the two metals are in close proximity or stacking said gold atoms and nickel atoms on a carrier substrate, to form a thin film that can then be suitably heat treated to achieve bimetal.

As other metal atoms able to alloy with both the gold atoms and nickel atoms, for example, tungsten (W), which can improve the heat resistance of gold by alloying, may be mentioned.

Further, as the carrier, $Al_2O_3$, $SiO_2$, $CeO_2$, $CeO_2$—$ZrO_2$, and other metal oxides or carbon and silicon carbide may be mentioned.

When the $NO_X$ purification catalyst of the present invention is comprised of nanoparticles, it can be obtained by making the carrier support nanoparticles in which gold atoms and nickel atoms are included in a state of close proximity.

The nanoparticles in which gold atoms and nickel atoms are included in a state of close proximity can be obtained by, for example, reducing a mixture of gold salts and nickel salts in the presence of a protective polymer material using a reducing agent. The reducing agent used in, for example, a polyol, alcohol, $NaBH_4$, butyllithium, ammonia, borane and so on. The reduction reaction is performed in solution, preferably an aqueous solution, while under agitation.

At the end of the reduction reaction, the protective polymer material is separated and removed by, for example, centrifugal separation, solvent extraction, etc., and the obtained colloid in which the gold atoms and nickel atoms are present in a state of close proximity is uniformly mixed with the carrier so as to ensure that make the carrier supports nanoparticles which include gold atoms and nickel atoms in a state of close proximity.

The size of the Au—Ni particles with the gold atoms and nickel atoms contained in a state of close proximity can be 0.2 to 100 nm, preferably 2 to 10 nm.

As the gold salts, aurochloric acid ($HAuCl_4$), sodium tetrachloroaurate, potassium tetrachloroaurate, gold trisodium disulfite, potassium trisodium disulfite, etc. may be mentioned.

As the nickel salt, for example, nickel sulfate, nickel nitrate, nickel chloride, nickel bromide, nickel acetate, nickel hydroxide, etc. may be mentioned.

As the reducing polyols, ethylene glycol, diethylene glycol, triethylene glycol, tetraethylene glycol, 1,2-propanediol, dipropylene glycol, 1,2-butanediol, 1,3-butanediol, 1,4-butanediol, 2,3-butanediol, 1,5-pentanediol, polyethylene glycol, etc. may be mentioned. To complete the reduction of the gold ions and nickel ions, at the final stage of reduction, for example, boron dimethylamide, boron diethylamide, sodium borohydrate, borane, or another boron compound can be added as a reducing agent.

As the protective polymer material, poly-N-vinylpyrrolidone (PVP), polyacrylamide, N-vinylpyrrolidone and acrylic acid copolymer, polyvinylpiridine, polyvinylmethylketone, poly(4-vinylphenol), oxazoline polymer, polyalkylene imine, and other polymers containing functional groups may be mentioned.

Further, when the $NO_X$ purification catalyst of the present invention is in the form of a thin film, the outermost layer may be either a thin layer of nickel or a thin layer of gold. The $NO_X$ purification catalyst of the present invention, for example, can take the form of a thin film with an outermost layer of a 0.25 to 50 nm, in particular 1 to 5 nm, nickel thin film and an underlying layer that is a 0.25 to 50 nm gold thin film. Alternatively, it may take the form of a thin film with an outermost layer of a 0.25 to 10 nm, in particular 1 to 5 nm, gold thin film and an underlying layer that is a 10 to 50 nm or so nickel thin film.

In the thin film, the amounts of deposition of gold and nickel, the establishment of a reducing atmosphere, the heating temperature, and the heating time can be changed in order to alter the composition of the two elements in the outermost layer.

The thin film-like $NO_X$ purification catalyst is suitably heat treated to cause alloying of the gold and nickel.

The heating may for example be performed by using an infrared laser to heat the deposit to a temperature of between 350° C. to 450° C.

Further, the heating may be radiant heating or electron beam heating. At the time of heating, the sample table on which the sample is placed is preferably one which was well heated in the past. That is, it is preferably one that will not release any highly reactive gas when heated.

The $NO_X$ purification catalyst of the present invention preferably takes the form of primary particles or a thin film containing gold and nickel as main ingredients of the solid. The relative ratios of gold and nickel in the solid is in the range Au:Ni=7:93-91:9 (at %), and preferably 20:80-80:20 (at %). The optional range of metal ratios is Au:Ni=40:60-60:40. If the composition of gold and nickel in the solid is outside that range, the $NO_X$ purification performance of the $NO_X$ purification catalyst tends to drop.

The $NO_X$ purification catalyst that constitutes the present invention combines Au and Ni in close proximity and demonstrates a synergistic effect which gives a superior $NO_X$ purification performance. This performance cannot be matched using Au or Ni ingredients singly. In particular, the present invention demonstrates superior catalytic activity in $NO_X$ purification compared even to other alloys and Rh or other single precious metal particles.

In contrast to previous catalyst for the $NO_X$ purification catalyst that constitutes the present invention, the temperature required to raise the $NO_X$ purification activity to a significant level does not need to be high. Even in an oxidizing atmosphere, the present invention has an $NO_X$ purification ability, so the use of fuel for making the atmosphere a reducing atmosphere becomes unnecessary or can be greatly reduced.

Further, according to the $NO_X$ purification catalyst of the present invention, there is no need to lower the air-fuel ratio (A/F) in the engine. For example, during steady state operation at a high air-fuel ratio (for example, stoichiometric, where A/F=14.7), a gasoline engine can exhibit an A/F≥20, while for a diesel engine an A/F≥30 is possible.

EXAMPLES

Below, examples of the present invention will be shown.

In the following examples, the obtained catalysts were evaluated by the methods of measurement shown below.

1. Measurement of $O_2$ Desorption Temperature and $N_2$ Desorption Temperature

Measurement method: Measurement of peak intensity by AES (Auger electron spectroscopy) while changing heating temperature Measurement apparatus: KITANO SEIKI KCMA2002

2. Measurement of NO Disassociative Adsorption Temperature

Measurement method: Measurement of XPS (X-ray photoelectron spectroscopy) spectrum while changing heating temperature Measurement apparatus: ϕESCA1600

3. Measurement of Bimetal Composition of Catalyst

Measurement method: Measurement of composition of bulk as a whole by XRD (X-ray diffraction)

Measurement apparatus: PHILIPS X'Pert MRD

4. Measurement of Particle Shape and Particle Size Distribution of Bimetal Nanoparticles Measurement method 1: Measurement by TEM (transmission electron microscope)

TEM measurement apparatus: JEOL JEM-3011

Measurement method 2: Measurement by HRTEM (high resolution transmission electron microscope)

HRTEM Measurement apparatus: HITACHI HD2000

5. Measurement of Elemental Analysis of Alloy Nanoparticles

Measurement method: Measurement of composition by TEM-EDS (EDS: energy dispersive X-ray spectroscopy)

TEM-EDS measurement apparatus: HITACHI HD2000

6. Measurement of Ratio of Elements in Surface of Thin Film

Measurement method: Measurement of ratio of Au:M for example, M=nickel) by AES (Auger electron spectroscopy)

Measurement apparatus: KITANO SEIKI KCMA2002

7. Evaluation of NO Disassociative Adsorption

Measurement method: Measurement, for $NO_X$ purification catalyst, of binding energy by N1s XPS spectrum after adsorption of NO at 1 Langmuir at room temperature Apparatus: ϕESCA 1600

8. Measurement of Catalytic Activity

Catalyst pellets were packed into a glass reaction tube and anchored by glass wool. A gas composed of 1000 ppm of NO and 1000 ppm of $H_2$ or CO and $N_2$ mixed in advance by balanced flow rates was run through the glass reaction tube. The gas temperature was raised at a temperature elevation rate of 20° C./min from 100° C. to 500° C. The NO concentration was measured by an exhaust gas analyzer (HORIBA MEXA7100H) or MS (mass spectrometry).

Note that, when running a hot gas that does not include $H_2$, the measurement was conducted at 500° C. after hydrogen reduction.

Example 1

1) Synthesis of AuNi Nanoparticles

In a two-necked flask, 1.1 g of poly-n-vinylpyrrolidone (PVP) was added to 120 ml of anhydrous ethylene glycol. Into this mixture, 0.1404 g of nickel sulfate heptahydrate was added. The mixture was agitated at 80° C. for 3 hours to obtain a solution (solution 1).

Separately, in a two-necked flask, 0.1809 g of $NaAuCl_4$ was added to 50 ml of distilled water. The mixture was strongly agitated for 2 hours or more to cause dissolution and obtain a bright orange colored solution (solution 2).

The solution 1 was cooled to 0° C. Solution 2 was poured into solution 1 and the two were uniformly agitated. The mixed solution was adjusted by a 1M NaOH solution (about 5 ml) to give a pH of 9 to 10. The mixed solution was heated in an oil bath to 100° C. and was held there for 2 hours while being agitated. After this, the flask was removed from the oil bath and allowed to stand until the colloidal suspension had cooled to room temperature. To completely reduce all of the ions in the flask, sodium borohydride 0.038 g was added whilst stirring the mixture, then the suspension was allowed to stand for a while.

The produced nanoparticles were refined by treating a certain fraction including a predetermined amount of nanoparticles with a large amount of acetone. This caused, the PVP to be extracted to the acetone phase, and the metal nanoparticles to coagulate. The supernatant was transferred (decanted) or centrifuged to obtain the colloid. The acetone phase was removed, then the refined colloid was dispersed in pure ethanol by gentle stirring.

2. Supporting of AuNi Nanoparticles on a Carrier

In a 100 ml Schlenk flask, 1 g of the carrier (for example $Al_2O_3$) was inserted. The inside of the Schlenk flask was evacuated, then $N_2$ was run into it to clean the piping and completely remove the air. The concentration of the suspension of the colloid previously synthesized (both the refined colloid and remaining solution) was determined in advance, and a refined colloidal suspension containing Rh0.5 wt % molar equivalents of gold and nickel metal was injected through a rubber septum into the Schlenk flask. The mixture was agitated at room temperature for 3 hours, then the solvent was removed in vacuo. After this, the remaining polymer protective material of the colloidal precipitate was removed and the result dried at 200 to 1000° C. by heating under vacuum, air, H$_2$ atmosphere. The obtained catalyst powder was pressed to obtain pellets of approximately 2 mm size.

3. Evaluation of Catalyst

The obtained AuNi (50:50)/Al$_2$O$_3$ catalyst was measured for shape, particle size distribution, and elemental analysis of the bimetal particles by TEM and TEM-EDS.

TEM images are shown in FIG. 1A, FIG. 1B, and FIG. 1C, and a histogram representing of the size of the nanoparticles and showing the size distribution of 100 particles in HRTEM images is shown in FIG. 3. The mean size of the nanoparticles was 3.75 nm±0.70 nm.

Further, the TEM-EDS spectrum measured for an AuNi (50:50) colloid on a copper coated grid is shown in FIG. 5. From FIG. 5, it is shown that all individual particles include gold and nickel.

Furthermore, the obtained AuNi (50:50)/Al$_2$O$_3$ catalyst was measured for NO purification characteristics under the following gas flow conditions.

Gas Flow Conditions
Gas composition: NO 1000 ppm, CO 1000 ppm, N$_2$ bal/10 liter
Flow rate: 500 ml/min, pellets: 150 mg,
Space velocity: 3.3 liters/min·g
Ni, base metal concentrations: each 0.0486 mmol/g-cat
The results are shown together with other results in FIG. 7, FIG. 8, and FIG. 9.

Comparative Example 1

Except for not using the solution 1, the same procedure was followed as in Example 1 to obtain an Au/Al$_2$O$_3$ catalyst.

The obtained Au/Al$_2$O$_3$ catalyst was measured for NO purification characteristics in the same way as in Example 1. The results are shown together with other results in FIG. 7, FIG. 8, and FIG. 9.

Comparative Example 2

Preparation of Ni Nanoparticles 4.400 g of PVP was added to 120 ml of anhydrous ethylene glycol. 0.2811 g of nickel(II) sulphate heptahydrate was added to this mixture (to give a total metal loading equivalent to that used in previous 50:50 AuNi preparations) and the resulting pale green system was stirred for 3 hours at 80° C. The solution was cooled to 0° C. and 50 ml of 1,4-dioxane was introduced, whereupon the pH of the system was adjusted to 9-10 using 1M NaOH (ca. 5 ml). The mixture was stirred at reflux at 198° C. for 3 hours before being allowed to cool to room temperature, giving a pale brown suspension. Purification and deposition were by a same route as Au—Ni nanoparticles.

Supporting of Nickel Nanoparticles
In a 100 ml Schlenk flask, 1 g of the carrier (for example Al$_2$O$_3$) was inserted. The inside of the Schlenk flask was evacuated, then N$_2$ was used to purge the piping. The concentration of the suspension of the colloid previously synthesized (both the refined colloid and remaining solution) was determined in advance, and a refined colloidal suspension containing Rh0.5 wt % molar equivalents of nickel metal was injected into the Schlenk flask. The mixture was agitated at room temperature for 3 hours, then the solvent was removed in vacuo. After this, the remaining protective material of the colloidal precipitate was removed and the resulting material was dried at 200 to 600° C. by firing in a vacuum or in the air. The obtained catalyst powder was pressed to obtain Ni/Al$_2$O$_3$ catalyst pellets of approximately 2 mm size.

The obtained Ni/Al$_2$O$_3$ catalyst was measured in the same way as in Example 1 for NO purification characteristics. The results are shown together with other results in FIG. 7, FIG. 8, and FIG. 9. Further, the NO disassociative adsorption was evaluated. The results are shown together with other results in FIG. 10.

Comparative Example 3

Except for separately using nickel sulfate heptahydrate and NaAuCl$_4$, the same procedure was followed as in Comparative Example 2 to cause metal to precipitate by evaporation of a gold and nickel mixed metal ion solution and thereby obtain (Au+Ni) mixture/Al$_2$O$_3$ catalyst pellets in which gold and nickel are not present in a state of close proximity.

The obtained catalyst was measured in the same way as in Example 1 for NO purification characteristics. The results are shown together with other results in FIG. 7, FIG. 8, and FIG. 9.

Comparative Examples 4 to 8

Except for replacing the nickel sulfate heptahydrate in Example 1 with tungsten chloride (Comparative Example 4), rhenium chloride (Comparative Example 5), or manganese acetate (Comparative Example 6), or molybdenum acetate (Comparative Example 7) or using copper acetyl acetonate and further changing the amount of the substrate (Comparative Example 8), the same procedure was followed as in Example 1 to obtain an AuW (50:50)/Al$_2$O$_3$ catalyst, AuRe (50:50)/Al$_2$O$_3$ catalyst, AuMn (50:50)/Al$_2$O$_3$ catalyst, AuMo (50:50)/Al$_2$O$_3$ catalyst, or AuCu (Cu:5.9%)/Al$_2$O$_3$ catalyst.

The NO purification characteristics of the obtained catalysts were measured in the same way as in Example 1. The results are shown together with the results of the catalyst from Example 1 in FIG. 8.

Examples 2 to 3

Except for changing the ratio of gold and nickel from Au:Ni=50:50 to Au:Ni=25:75 (Example 2) and to Au:Ni=75:25, the same procedure was followed as in Example 1 to obtain an AuNi (25:75)/Al$_2$O$_3$ catalyst and an AuNi (75:25)/Al$_2$O$_3$ catalyst.

The obtained catalysts were measured for NO purification characteristics in the same way in Example 1. The results are shown together with other results in FIG. 9.

Examples 4 to 5 and Reference Example 1

Except for changing the ratio of gold and nickel from Au:Ni=50:50 to Au:Ni=3:7 (Example 4) and to Au:Ni=6:4 (Example 5) and using iron acetate instead of nickel sulfate to change the composition from Au:Ni=50:50 to Au:Fe=6:4 (Reference Example 1), the same procedure was followed as in Example 1 to obtain an AuNi (3:7)/Al$_2$O$_3$ catalyst, AuNi (6:4)/Al$_2$O$_3$ catalyst, and AuFe (6:4)/Al$_2$O$_3$ catalyst.

The obtained catalysts were evaluated for NO disassociative adsorption. The results are shown together with other results in FIG. 10.

The results in FIG. 10 show that the NO disassociative adsorption of AuNi differs from that of AuFe.

Example 6

Except for changing the carrier from $Al_2O_3$ to $SiO_2$, the same procedure was followed as in Example 1 to obtain an AuNi (50:50)/$SiO_2$ catalyst.

The obtained AuNi(50:50)/$SiO_2$ catalyst was measured for the shape and particle size distribution of the bimetal particles.

A TEM image is shown in FIG. 2A, a TEM image changed in scale is shown in FIG. 2B, and a dispersion histogram showing the size of the nanoparticles and revealing the distribution of 100 particles in strictly multiple HRTEM images is shown in FIG. 4.

Further, the TEM-EDS spectrum measured for an AuNi (50:50) colloid on a copper coated grid is shown in FIG. 6, wherein Au—Ni colloids are placed on a Cu coated grid, and Cu peaks come from the grid. From FIG. 6, it is evident that all individual particles include gold and nickel.

Furthermore, the obtained AuNi (50:50)/$Al_2O_3$ catalyst was measured for NO—$H_2$ catalytic activity under the following gas flow conditions.

Gas Flow Conditions
Gas composition: NO 1000 ppm, $H_2$ 1000 ppm, $N_2$ bal/10 liters
Flow rate: 10 liters/min, pellets: 2 g,
Space velocity: 5 liters/min-g
Ni, base metal concentration: each 0.0486 mmol/g-cat
The obtained results are shown together with other results in FIG. 11.

Comparative Example 9

Except for changing the carrier from $Al_2O_3$ to $SiO_2$, the same procedure was followed as in Comparative Example 1 to obtain an Au/$SiO_2$ catalyst.

The obtained catalyst was measured for NO—$H_2$ catalytic activity. The results are shown together with other results in FIG. 11.

Comparative Example 10

Except for changing the carrier from $Al_2O_3$ to $SiO_2$, the same procedure was followed as in Comparative Example 2 to obtain an Ni/$SiO_2$ catalyst.

The obtained catalyst was measured for NO—$H_2$ catalytic activity. The results are shown together with other results in FIG. 11.

Comparative Example 11

Except for using manganese sulfate instead of nickel sulfate, the same procedure was followed as in Example 6 to obtain an AuMn (50:50)/$SiO_2$ catalyst.

The obtained catalyst was measured for NO—$H_2$ catalytic activity. The results are shown together with other results in FIG. 11.

From FIG. 7, FIG. 8, FIG. 9, and FIG. 11, it is evident that the AuNi/carrier-based $NO_X$ purification catalysts that represent the embodiments of the present invention exhibit good $NO_X$ purification performance at a relatively low temperature and/or in an oxidizing atmosphere.

Example 7

As shown in the schematic view in FIG. 12, the following steps were used to form gold on an $Al_2O_3$ (sapphire) substrate, then to deposit nickel to form a thin film, then heat-treat this to prepare an $NO_X$ purification catalyst that takes the form of an AuNi bimetal thin film/$Al_2O_3$ substrate.

1) An ion sputter apparatus (HITACHI E101, energy 100 eV, ion current 15 mA) is used to form a gold sputtered film on an $Al_2O_3$ (sapphire) substrate. The sputtering operation was performed for 2 minutes five times that is, for a total of 10 minutes to deposit a uniform gold film with a thickness of approximately 50 nm.

2) The deposited material was conveyed to the vacuum chamber of a PLD (pulsed laser deposition) apparatus provided with an X-ray photoelectron spectroscopy (XPS) device as shown in FIG. 12.

This PLD and analysis means are in-situ. However, there is no need for them to be in-situ. The same may be conveyed with a single exposure to air if the pre-treatment shown below is then performed immediately prior to analysis.

3) An excimer laser (LAMBDA PHYSIC, 25 to 29 kV, 1 to 10 Hz, KrF 3000 mbar) was used to fire a beam into the chamber such as to strike a nickel target and deposit a second ingredient (nickel) and to thereby form a uniform nickel film of several nm thickness.

4) Under a vacuum, an infrared laser was used to heat the deposited sample to 350° C. to cause bimetalation and so obtain an $NO_X$ purification catalyst of an AuNi bimetal thin film/$Al_2O_3$ substrate.

Next, the obtained catalyst was evaluated by the following processes.

5) 1 Langmuir ($5.0 \times 10^{-6}$ Pa, 44 s/1 Langmuir, room temperature: 25° C.) of NO gas was introduced to the chamber and the NO gas was adsorbed on the catalyst.

6) XPS apparatus (ΦESCA1600, Monochlo Al-Ka (1486.7 eV), 350 W, 14.0 kV) was used to observe the N1s signal (at room temperature) and so to monitor NO disassociative adsorption, $N_2$ desorption, and $O_2$ desorption characteristics. The peak position could be used to discriminate between an NO adsorption state and an N/O disassociation state.

The NO disassociative adsorption, $N_2$ desorption, and $O_2$ desorption characteristics were measured. The results are shown together with other results in FIG. 14 and FIG. 15.

Further, the temperature-dependence of the NO treatment on the surface Ni/Au ratio of the alloy thin film was measured by NO treatment under the following conditions. The results of measurements are shown together in FIG. 16.

NO treatment conditions: NO was fed in at $5 \times 10^{-6}$ Pa for 45 seconds, then the temperature was raised at a temperature elevation rate of 5° C./rain.

Comparative Examples 11 to 13

Except for depositing single metals on the substrates and not changing the thicknesses of the thin films, the same procedure was followed as in Example 7 in order to obtain an Ni thin film/$Al_2O_3$ substrate $NO_X$ purification catalyst (Comparative Example 11), a Fe thin film/$Al_2O_3$ substrate $NO_X$ purification catalyst (Comparative Example 12), and a Rh thin film/$Al_2O_3$ substrate $NO_X$ purification catalyst (Comparative Example 13).

The obtained catalysts were measured for NO disassociative adsorption, $N_2$ desorption, and $O_2$ desorption characteristics.

The obtained results are shown together with the other results in FIG. 14 and FIG. 15.

Reference Example 2

Except that Fe substrate was used in place of Ni substrate, the same procedure was followed as in Example 7 to obtain an AuFe bimetal thin film/$Al_2O_3$ substrate $NO_X$ purification catalyst.

The obtained catalyst was measured for NO disassociative adsorption, $N_2$ desorption, and $O_2$ desorption characteristics. The obtained results are shown in FIG. 14 and FIG. 15.

Further, the temperature-dependence of the NO treatment on the surface Fe/Au ratio of the thin film was measured. The obtained results are shown together with other results in FIG. 16.

The results in FIG. 16 show that for an AuFe system, as the NO treatment temperature is raised above 400° C., the surface Fe/Au ratio rapidly increases. In comparison, for an AuNi system, the surface Ni/Au ratio remain constant at all temperature tested, demonstrating that the bimetal surface conditions can easily be kept constant in the range of 200 to 650° C.

Further, from the results of FIG. 14 and FIG. 15, when nickel and gold are present in close proximity in a solid comprised of a multilayer thin film, even if the surface is 100% nickel, heat treatment enables biametalation to occur. Subsequently, NO disassociative adsorption occurs at about 200° C. or less, the temperatures of $N_2$ desorption and $O_2$ desorption both fall to about 425° C. Significant lowering of the $O_2$ desorption temperature relative to that of 700° C. or more for an Rh thin film represents a remarkable achievement and clearly demonstrates the advantage of the present invention.

Comparative Examples 14 to 17

The catalysts were synthesized according to the synthetic method described in Japanese Unexamined Patent Publication (Kokai) No. 10-216518. Their performances as the catalyst were compared by including the catalyst of the present invention. The synthetic method described in the above publication is the co-impregnation method (Au, Ni co-impregnation).

Preparation of Catalysts

1) Synthesis of Catalyst Component 1-1: $Au/Al_2O_3$, 1-2: $Au/SiO_2$

In a manner similar to Working Example 1 except that solution 1 described in the Example was not added, the powdery $Au/Al_2O_3$ or $Au/SiO_2$ catalyst was prepared.

2) Synthesis of Catalyst Component 2-1: $Ni/Al_2O_3$, 2-2: $Ni/SiO_2$ 4.400 g of poly-n-vinyl pyrrolidone (PVP) was added to 120 ml of anhydrous ethylene glycol in a forked flask. 0.2811 g of nickel sulphate heptahydrate was added to this mixture at the same molar amount as the total moles of Au and Ni in Working Example 1, and the resulting mixture was stirred for 3 hours at 80° C. The mixture was cooled to 0° C. in a cooling bath and 1,4-dioxane (50 ml) was introduced, and then stirred to homogeneity. The pH of the mixture was adjusted by adding about 5 ml of 1M NaOH. The mixture was heated to 198° C., and the temperature was maintained while stirring for 3 hours before being allowed to cool to room temperature, resulting in a pale brown suspension. Purification and deposition onto a carrier were carried out in the same way as in Working Example 1 to obtain a catalyst.

3) Synthesis of Catalyst 3-1: Au+ $Ni/Al_2O_3$, Catalyst 3-2: Au+ $Ni/SiO_2$

Nickel sulfate (or nickel acetate) and chlorauric acid of the same amounts as those used in Working Example 1 were dissolved in 100 ml of water. In a separate vessel, the mixed aqueous solution of nickel sulfate and chlorauric acid was added to a colloid suspension in which 50 g of carrier ($Al_2O_3$ or $SiO_2$) was introduced in 200 ml of water while stirring, and the mixture was allowed to stand for 2 hours. Then, the liquid was evaporated at 70-90° C., the residue was dried at 120° C. for 15 hours, and calcined at 500° C. for 2 hours. The resulting catalyst powder was subjected to pressure to obtain the pellets of about 2 mm.

4) Preparation of Catalyst 4-1: $Au+Ni/Al_2O_3$, 4-2: $Au+Ni/SiO_2$

Each of the above catalyst component 1-1 and catalyst component 2-1, and catalyst component 1-2 and catalyst component 2-2 powders was mixed, respectively, in a mortar. The resulting catalyst powder was subjected to pressure to obtain pellets of about 2 mm.

Evaluation of Catalysts

In catalyst 3-1 (Comparative Example 14), catalyst 4-1 (Comparative Example 16) obtained as above and the catalyst obtained in Working Example 1, the method of Working Example 1 was followed to determine NO-purification characteristics except that only Comparative Example 14: $Au+Ni/Al_2O_3$ was subjected to a $H_2$ reduction treatment at 1000° C. according to the method described in the above publication and a different measuring instrument was used. The catalyst obtained in Working Example 6 and catalyst 3-2 (Comparative Example 15): $Au+Ni//SiO_2$ were subjected to a $H_2$ reduction treatment at 1000° C. according to the method described in the above publication, and the XRD spectrum was measured.

Figure 23:
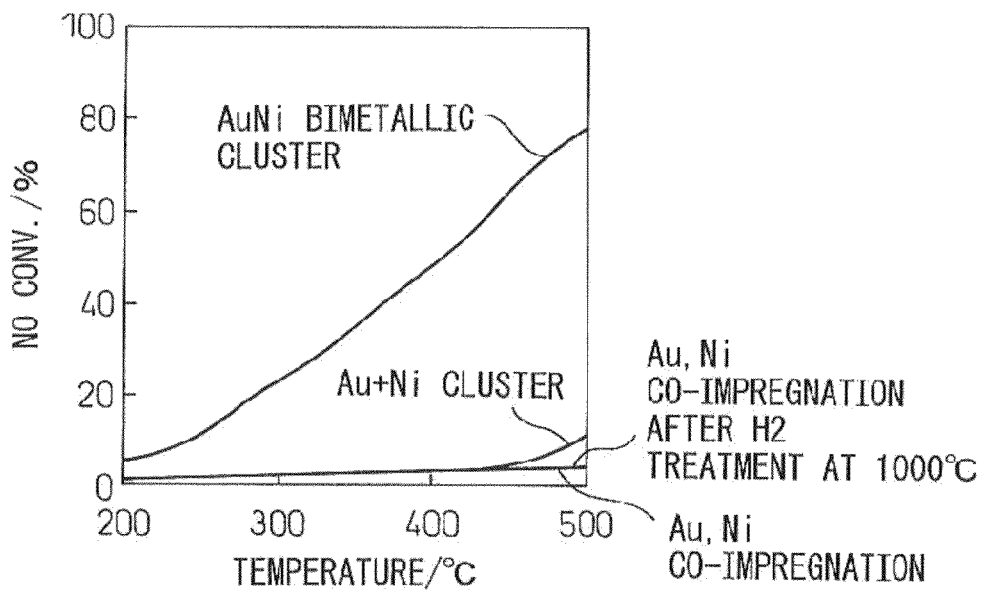
FIG. 23 is a graph showing a comparison of the NO purification characteristics of $NO_X$ purification catalysts obtained as an invention example with $NO_X$ purification catalysts outside the range of the invention.
Figure 24:
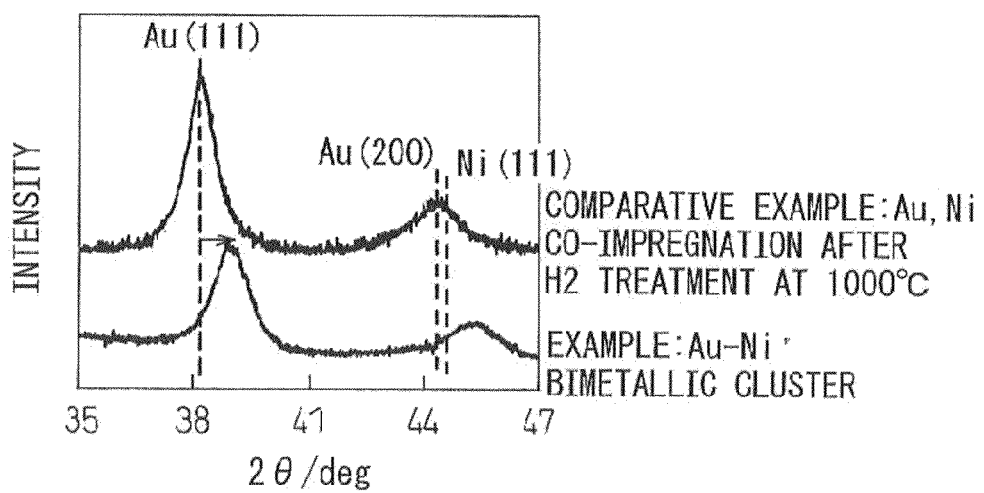
FIG. 24 shows the X-ray diffraction of AuNi/$SiO_2$-based $NO_X$ purification catalysts obtained as an example of the invention and $NO_X$ purification catalysts outside the scope of the present invention.

The results of evaluating NO-purification characteristics are collectively shown in FIG. 23, and the results of measuring the XRD spectrum are shown in FIG. 24.

FIG. 23 indicates that the $NO_x$-purification catalyst of the present invention exhibits a high NO-purification performance whereas the Au, Ni-co-impregnation catalyst of Comparative Example 14 does not. One conceivable reason for this is that from FIG. 24 showing the XRD spectra of both catalysts, the Au, Ni-co-impregnation catalyst described in Japanese Unexamined Patent Publication (Kokai) No. 10-216518 does not exhibit a shift of the X-ray diffraction peak to the Ni(1111) peak, i.e., both metals (Au, Ni) are not in a state adjacent to each other.

According to the $NO_X$ purification catalyst that constitutes the present invention, from the viewpoint of resource depletion, gold can be used with nickel, which is present in the environment to about the same extent as copper. The temperature required for efficient $NO_X$ purification activity is lower than has been the case previously. Further, $NO_X$ purification activity can even be recorded in an oxidizing atmosphere, so use of fuel for making the atmosphere a reducing one becomes unnecessary or at least can be greatly decreased. There is no need, when operating under steady-state conditions, to make the air-fuel ratio (A/F) close to stoichiometric (A/F=14.7). Operation at a high air-fuel ratio (A/F) of, for example, theoretically, in the case a gasoline engine, an A/F=20 and, in the case of a diesel engine, an A/F=30, is possible.

While the invention has been described with reference to specific embodiments chosen for the purpose of illustration, it should be apparent that numerous modifications could be made thereto by those skilled in the art without departing from the basic concept and scope of the invention.

The invention claimed is:

1. A nitrogen oxide purification catalyst for purifying $NO_x$ in an exhaust gas by contacting the catalyst with the exhaust gas at a temperature including the range of 350 to 500° C., the catalyst comprising:
   an alloy consisting of gold, nickel and an optional metal element that is able to alloy with said gold and nickel, in a solid supported on a metal oxide carrier,
   wherein an average particle size of said solid is 1.5 to 5.5 nm, and wherein the composition ratio of said gold and nickel in said solid is Au:Ni=20:80 to 80:20 (at %).

2. The catalyst as set forth in claim 1, wherein the composition ratio of said gold and nickel in said solid is Au:Ni=40:60-60:40(at %).

3. The catalyst as set forth in claim 1, wherein said optional metal element is not present.

4. The catalyst as set forth in claim 1, wherein said alloy consists of Au, Ni and W.

* * * * *